United States Patent [19]
Maetani et al.

[11] Patent Number: 5,272,352
[45] Date of Patent: Dec. 21, 1993

[54] RETRIEVAL SYSTEM

[75] Inventors: Masami Maetani, Ageo; Katsuhiko Okitsu, Yokohama, all of Japan

[73] Assignee: Canon Kabushiki Kaisha, Tokyo, Japan

[21] Appl. No.: 870,384

[22] Filed: Apr. 17, 1992

[30] Foreign Application Priority Data

Apr. 24, 1991 [JP]  Japan ................... 3-122248
May 29, 1991 [JP]  Japan ................... 3-1555801

[51] Int. Cl.⁵ ............................................. G06K 7/10
[52] U.S. Cl. ................................ 250/561; 250/570; 353/26 A
[58] Field of Search ............... 250/561, 562, 551, 559, 250/572, 570; 353/26 A

[56] References Cited

U.S. PATENT DOCUMENTS

| | | | |
|---|---|---|---|
| 3,972,624 | 8/1976 | Klein et al. | 356/200 |
| 3,999,846 | 12/1976 | Sone et al. | 352/26 A |
| 4,043,652 | 8/1977 | Mickelson | 353/26 A |
| 4,600,841 | 7/1986 | Tokuno et al. | 250/548 |
| 4,665,318 | 5/1987 | Toda et al. | 250/570 |
| 4,687,321 | 8/1987 | Itoh | 250/570 |
| 5,137,347 | 8/1992 | Imai | 353/26 A |
| 5,146,247 | 9/1992 | Kashiwagi | 353/26 A |

*Primary Examiner*—David C. Nelms
*Assistant Examiner*—T. Davenport
*Attorney, Agent, or Firm*—Fitzpatrick, Cella, Harper & Scinto

[57] ABSTRACT

A film retrieval system comprises a light source for illuminating a film having marks applied thereon, a photo-detector for detecting light intensity transmitted from the illuminated film, a device for determining a reference in accordance with the light intensity detected by the photo-detector, a discriminator for determining the presence or absence of the mark by comparing the reference determined by the reference device and an output of the photo-detector and, a setting device for setting a detection point of the transmitted light intensity by the photo-detector at any point spaced from a leading edge of the film.

13 Claims, 8 Drawing Sheets

RETRIEVAL SYSTEM

BACKGROUND OF THE INVENTION

1. Field of the Invention

The present invention relates to a retrieval system for retrieving a desired frame of a web-like microfilm by transporting it and counting marks applied on the microfilm.

2. Related Background Art

A prior art retrieval system (U.S. Pat. No. 4,665,318) comprises a light source such as a halogen lamp, an optical fiber, a photo-electric converter, an amplifier, a comparator and a counter. A web-like microfilm 100 as shown in FIGS. 5A–5C is transported and illuminated by the light source, opaque flip marks which interrupt a transmitted light from the microfilm 100 are detected by mark detection means, and the detected marks are counted by the count means to retrieve a desired image frame 102.

Figure 5A:
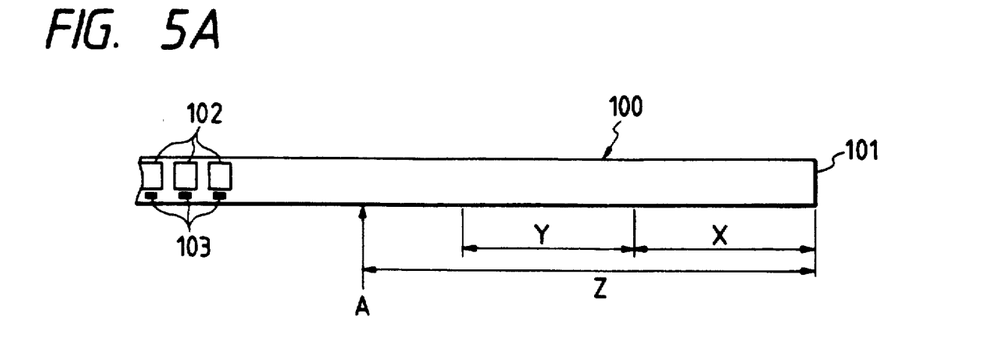
FIGS. 5A, 5B and 5C show plan views of a microfilm used in a prior art retrieval system.
Figure 5B:
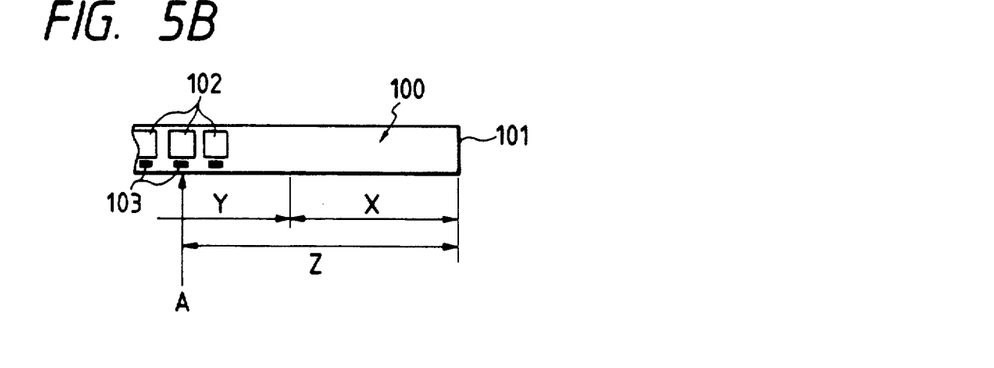
Figure 5C:
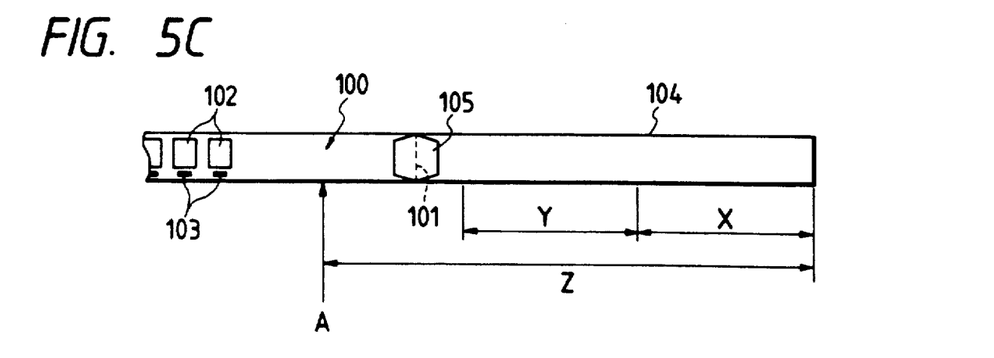

As shown in FIG. 5A, in order to secure the retrieval of the microfilm 100, a transmitted light intensity (density) of a transparent leading portion of the microfilm 100 is detected to determine a reference prior to the retrieval, and when the image frame 102 is to be retrieved, an output of the photo-electric conversion element which senses the light from the mark is compared with the reference (threshold) to determine the presence or absence of the flip mark, and the detected flip mark is counted by the count means.

The reference is determined based on the detected transmitted light intensity at an area Y spaced from the leading edge 101 of the microfilm 100 by a predetermined distance X. Accordingly, in order to accurately detect the light intensity, it is necessary that the length of the microfilm 100 from the leading edge 101 to the leading flip mark and the transparency of that area are constant.

The prior art system includes the following problems.

① The leading portion of the microfilm 100 may be bent or broken by a load by a film load/unload mechanism in an auto-loading mode or by a jam. In this case, since that portion is cut away, the leading portion of the microfilm 5B is so shortened that the area Y overlaps with the image frame 102. As a result, the correct detection of the transmitted light intensity is not attained.

② On the other hand, where the leading portion of the microfilm 100 is short as shown in FIG. 5B, a transparent leader tape 104 may be spliced to the leading portion of the microfilm 100.

However, a base density of the microfilm 100 and a base density of the leader tape 104 may materially differ from each other, or the leader tape 104 may include a dark area. When such a leader tape 104 is illuminated by the light source and the transmitted light intensity is detected to determine the reference, there is a risk that an error is included in the count of the flip marks 103 when the microfilm 100 is retrieved.

③ When the splice tape 105 is black (opaque), it interrupts the illumination light from the light source and it is misdetected as a flip mark. Thus, the count means miscounts the splice tape 105 as the flip mark, and an error results in the retrieval.

The counting of the flip mark is started from the count start point A which is spaced from the leading edge 101 of the microfilm 100 by a distance Z. Accordingly, in order to accurately count, it is necessary that the length of the microfilm 100 from the leading edge 101 to the count start point A is constant.

However, the prior art system involves the following problems.

④ The leading portion of the microfilm 100 may be bent or broken by a load by a load/unload mechanism for the auto-loading or by a jam. In this case, since that portion is cut away, the distance from the leading edge 101 to the leading flip mark 103 is shortened as shown in FIG. 5B. As a result, the leading flip mark 103 is not counted and the retrieval fails.

⑤ On the other hand, when the microfilm 100 is shortened as shown in FIG. 5B, a leader tape 104 may be joined to the microfilm 100 by a splice tape 105 as shown in FIG. 5C. However, not only the joining work is troublesome but also the splice tape 105 may overlap the count start point A or the splice tape 105 may include a dark area, which results in an error in the count.

SUMMARY OF THE INVENTION

It is an object of the present invention to provide a retrieval system which exactly detects the flip marks of the microfilm to attain accurate retrieval.

It is another object of the present invention to provide a retrieval system which exactly detects the flip marks without regard to a length or a density of a leading portion of the microfilm.

In order to achieve the above objects, the retrieval system of the present invention having a light source for irradiating a microfilm having flip marks applied thereon and means for detecting a transmitted light intensity from the irradiated microfilm to determine a reference of the transmitted light intensity is characterized by the provision of input means for setting a detection point of the transmitted light intensity at any point spaced from an end of the microfilm.

In accordance with the above feature of the present invention, the input means sets the detection points of the transmitted light intensity at any point spaced from the end of the microfilm. When the light source illuminates the detection point of the microfilm, the detection means detects the transmitted light intensity of the microfilm and determines the reference based on the detected data. In the retrieval mode, the presence or absence of the flip mark is determined based on the reference.

Further, in order to achieve the above objects, the retrieval system of the present invention having count means for starting to count the marks from a count start point spaced from the end of the microfilm by a predetermined distance is characterized by the provision of input means for setting the count start position at any point spaced from the end of the microfilm.

In accordance with the above feature of the present invention, the input means sets the count start point and the count means starts to count the marks from the count start point.

DETAILED DESCRIPTION OF THE PREFERRED EMBODIMENTS

Figure 1:
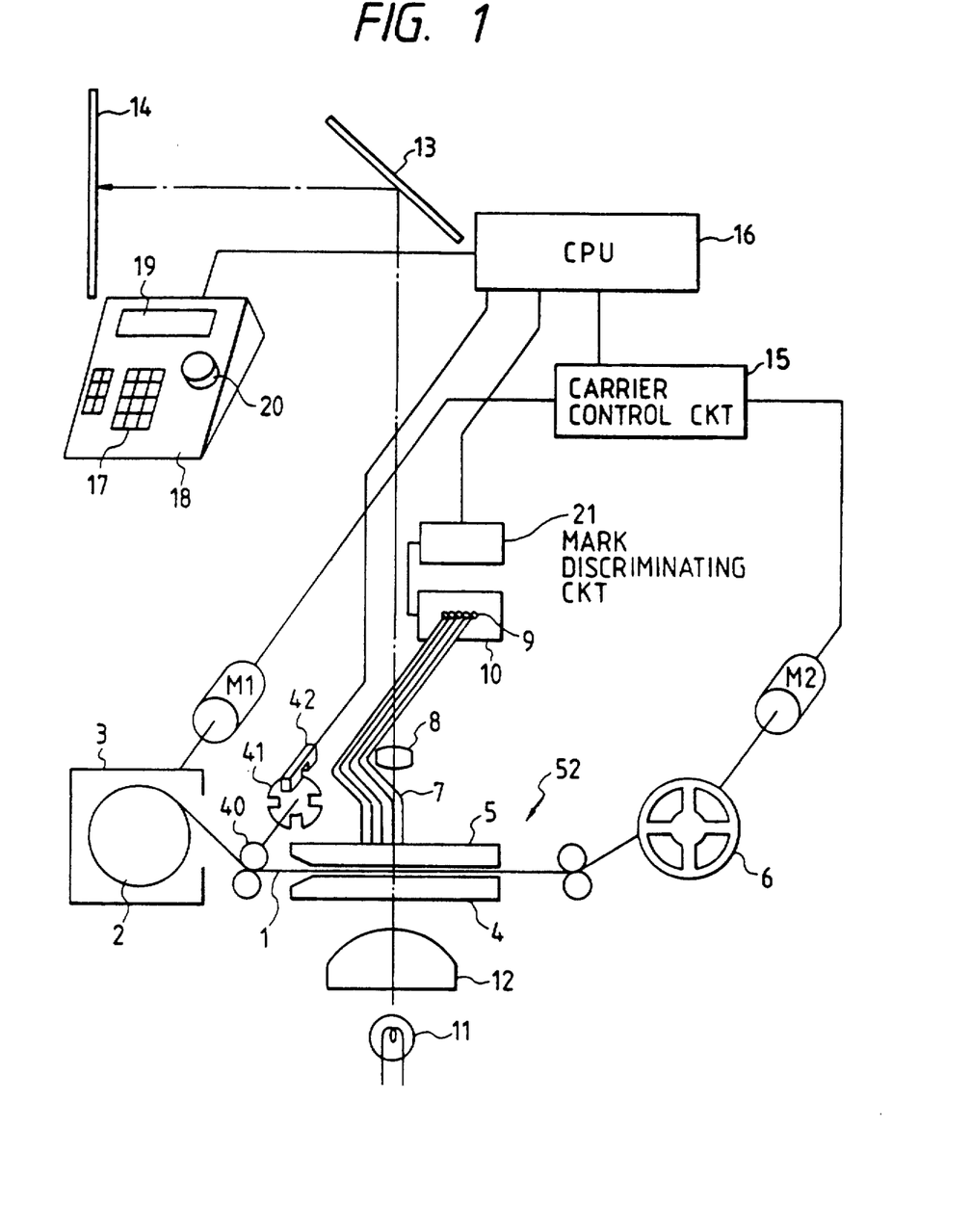
FIG. 1 shows a configuration of a first embodiment in which the present invention is applied to a microfilm retrieval system.
Figure 2A:
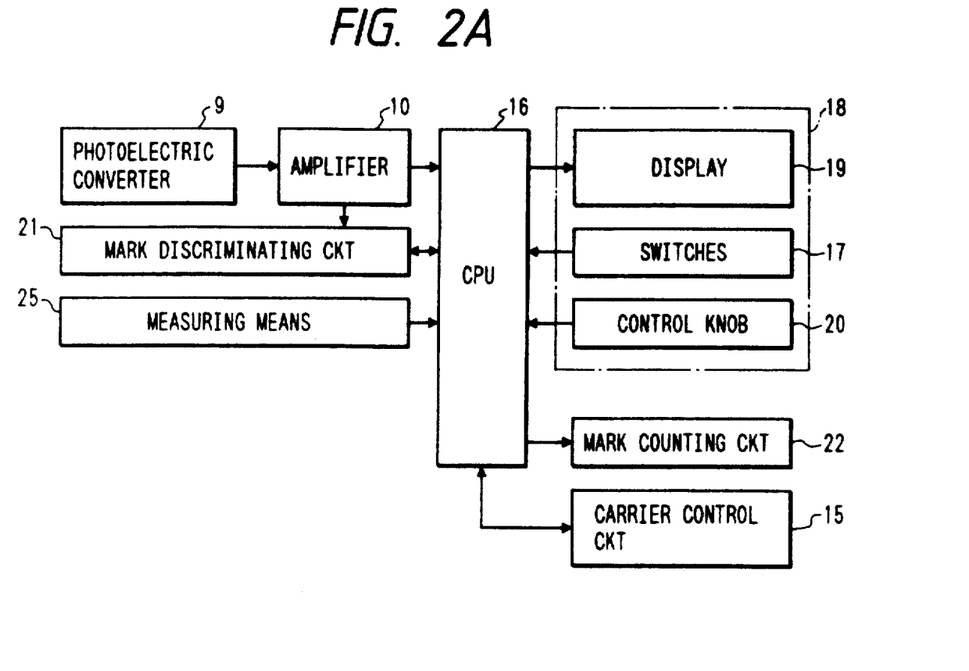
FIG. 2A shows a block diagram of principal circuits of the first embodiment.
Figure 2B:
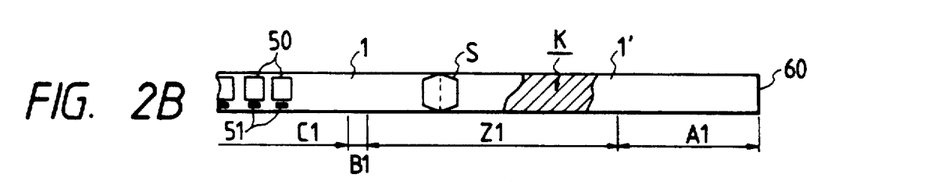
FIGS. 2B to 2D show general plan views of a microfilm used in the embodiment.

A first embodiment of the present invention is now explained with reference to FIGS. 1 and 2. FIG. 1 shows a general configuration of a microfilm retrieval system in accordance with the present invention, FIG. 2A shows a block diagram of principal circuits and FIG. 2B shows a plan view of a microfilm. In FIG. 2B, numeral 1 denotes a web-like microfilm having flip marks 51 applied thereon in association with image frames 50. The microfilm 1 is housed in a cartridge 3 while it is wound on a supply reel 2 as shown in FIG. 1. A pair of glass plates 4 and 5 are arranged to vertically face each other on a transport path 52 of the microfilm 1. The glass plates 4 and 5 closely contact to both sides of the microfilm 1 to keep it planar, and they are movable thicknesswise by a solenoid (not shown). Numeral 6 denotes a take-up reel. In FIG. 2B, numeral 1' denotes a leader tape joined to the microfilm 1 by a splice tape S.

In FIG. 1, numeral 7 denotes optical fibers arranged on an upper surface of the glass plate 5. The optical fibers 7 are linearly arranged at a predetermined pitch along a transport direction. The optical fibers 7 transmit a transmitted light from the microfilm 1 irradiated by a light source to be described later. Numeral 8 denotes a projection lens which projects an image of the microfilm 1 at an enlarged scale on a screen through a reflection mirror. Numeral 9 denotes a photo-electric conversion element such as a photo-transistor which converts the transmitted light from the optical fiber 7 to an electrical signal, numeral 10 denotes an amplifier for amplifying a small output current supplied by the photo-electric conversion element 9, numeral 21 denotes a mark discriminator which determines the presence or absence of a flip mark 51 based on the output of the amplifier 10, that is, the detection data of the transmitted light intensity and a command from a CPU 16, and numeral 22 denotes a mark counter which counts signals which the mark discriminator 21 has determined as the marks. The mark counter 22 starts to count the mark 51 from a predetermined count start point spaced from a leading edge 60 of the microfilm 1 by a predetermined distance. The mark discriminator 21 produces a mark detection signal when an output signal from the photo-electric conversion element 9 is larger than a slice level (threshold) determined by a detected transmitted light intensity, and otherwise it does not produce the mark detection signal. The mark counter 22 counts the mark detection signals produced by the mark discriminator 21.

On the other hand, a light source 11 such as a halogen lamp and a condenser lens 12 are arranged below the glass plate 4. Numeral 15 denotes a carrier control circuit for controlling the feed of motors M1 and M2 which drive the supply reel 2 and the take-up reel 6.

The CPU 16 controls a carrier control signal supplied from the carrier control circuit 15, the mark detection signal supplied from the mark discriminator 21 and an input signal from a keyboard (input means) 18. Numeral 17 denotes switches such as a ten-key on the keyboard 18, and numeral 19 denotes a display such as an LED or LCD. The display 19 displays a reading of an odometer and an address of the image frame 50 of the microfilm 1 when it is retrieved. Numeral 20 denotes a control knob. The loading and feed of the microfilm 1 may be done by manipulating the control knob 20.

Numeral 40 denotes a rubber roller for the odometer a slitted disk 41 is fixed to one end thereof to rotate with the rubber roller 40. Numeral 42 denotes a photo-sensor which generates pulses as the slitted disk 41 rotates. The rubber roller 40, the slitted disk 41 and the photo-sensor 42 form measurement means 25 for measuring a position to detect the transmitted light intensity.

Figure 3:
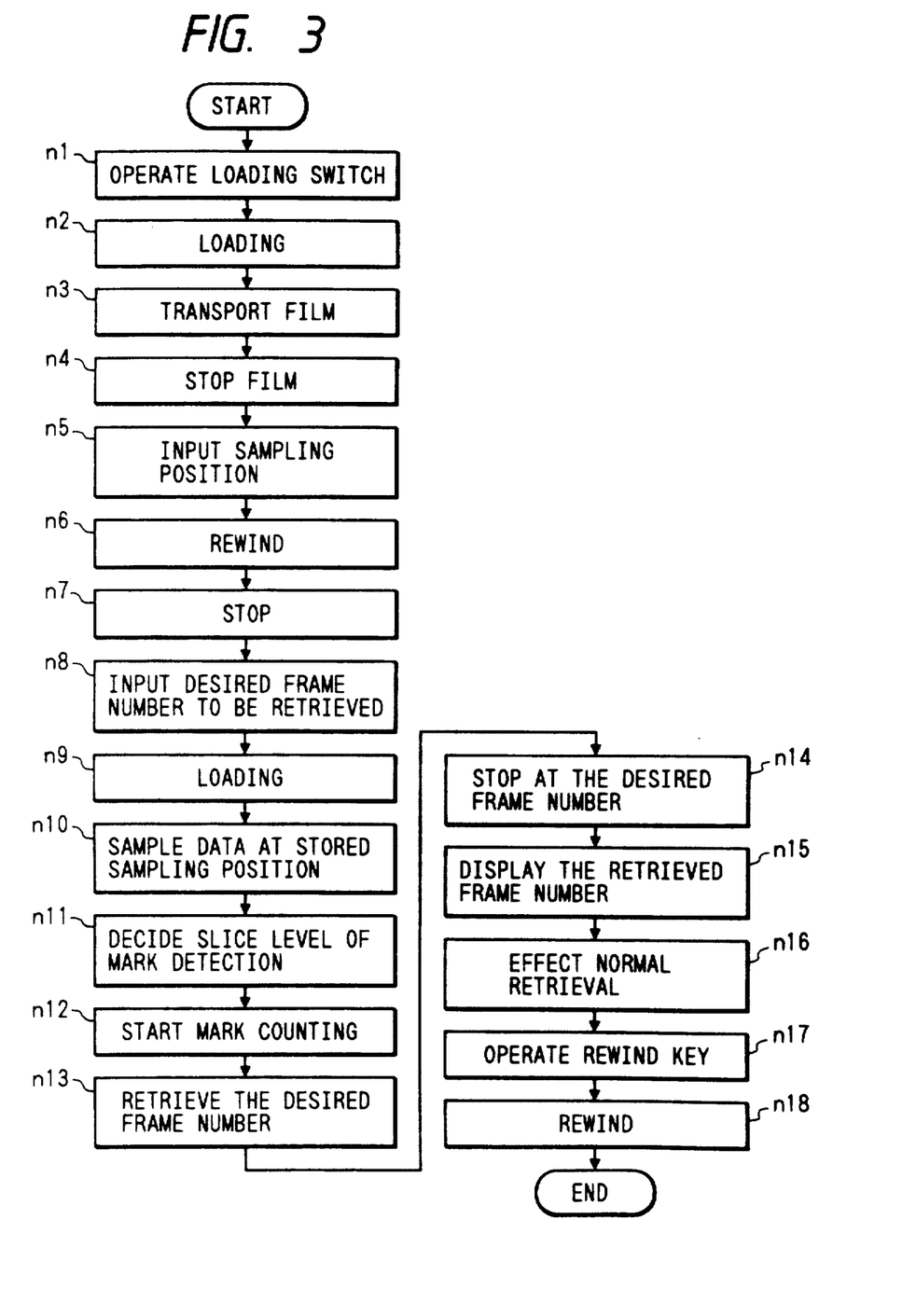
FIG. 3 shows a flow chart of an operation of the first embodiment.

An operation of the present embodiment is now explained with reference to a flow chart of FIG. 3. The control knob 20 which is a loading switch is first manually manipulated to command the feed of the film (n1). Then the CPU 16 sends an auto-load signal to the carrier control circuit 15. In the loading (n2), the leading edge of the microfilm 1 in the cartridge 3 is taken out by a take-out mechanism (not shown) and the rubber roller 40 is rotated so that the microfilm 1 passes between the glass plates 4 and 5 and is automatically wound on the take-up reel which is driven by the motor M2. As the winding is completed, a pulse signal is generated by the rotation of the slitted disk 41 and the photo-sensor 42 and it is read as the transport data of the microfilm 1 by the CPU 16. The length of transport from the leading edge 60 of the microfilm 1 to the irradiation position at the end of the winding is shown by Al in FIG. 2B.

Then, the control knob 20 is manually manipulated to further command the feed of the film (n3) and the sampling point (the point to detect the transmitted light intensity) is determined. When the sampling point has been determined (n4), the control knob 20 is manipulated to command the stop of the microfilm 1 in order to stop the transport of the microfilm 1. The content of the transport data displayed on the display 19 is entered as a point to the start of sampling, for example, a transport distance Z1 shown in FIG. 2B by the switches 17 such as the ten-key on the keyboard 18 (n5).

Then, the control knob 20 or a rewind key (not shown) on the keyboard 18 is manipulated (n6) to command the rewind of the film. Thus, the rewind motor M1 is activated by a signal from the CPU 16 and the microfilm 1 is rewound on the cartridge 3 and stops when the rewinding is completed (n7).

Through the series of steps, the entry of the sampling point is completed. In FIG. 2B, the start point for data sampling corresponds to the point on the microfilm 1 spaced from the end point Al of the auto-loading by the transport distance Z1. In actual, an area B1 is the sampling point because of a predetermined sampling time. An area C1 is a mark count area.

The frame position to be retrieved is entered by the ten-key 17 on the keyboard 18 (n8). When a search key (not shown) on the keyboard 18 is depressed, the auto-loading shown in n2 is conducted (n9). The microfilm 1 is fed by the transport distance Z1 to reach the sampling point stored in a memory of the CPU 16 (n10), and a transmitted light intensity of a base portion of the microfilm 1 is sampled in the area B1 which is determined by the sampling times of the microfilm transport speed.

The sampling is done by transmitting the transmitted light of the light source 11 through the base portion of the microfilm 1, through the optical fiber 7 and detecting it by the photo-electric conversion element 9.

Figure 4A:
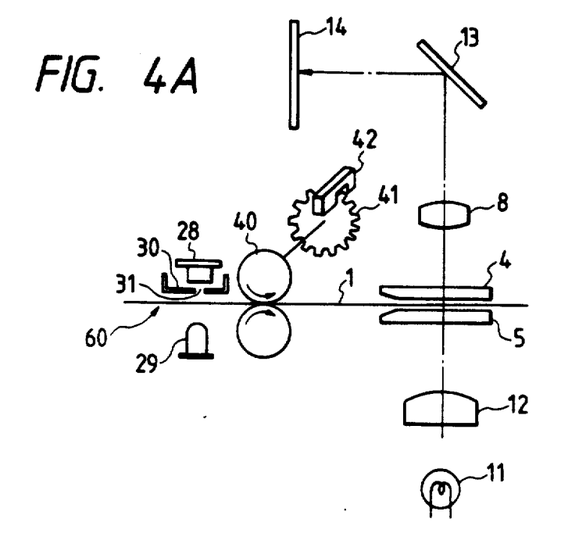
FIG. 4A shows a configuration of a second embodiment.

The CPU 16 determines a slice level to detect the mark based on the sampling data of the transmitted light intensity of the base portion of the microfilm 1. The counting of the mark to retrieve the image frame 5 is started from the area C1. In the present embodiment, a plurality of optical fibers 7 are arranged at a predetermined pitch and the mark is detected by the optical fiber 7 which the flip mark 51 on the microfilm 1 interrupts (n12). The mark discrimination is effected by the mark discriminator 21 and the CPU 16. When the image frame to be retrieved is reached, the CPU 16 sends a stop signal to the carrier control circuit 15 to control the motors M1 and M2 to stop at the image frame to be retrieved (n14). The image on the microfilm 1 is enlarged by the projection lens as shown in FIG. 4A and the light path is deflected by the reflection mirror 13 and the image is projected on the screen 14.

The image frame number retrieved is displayed on the display 19 on the keyboard 18. Subsequently, a normal retrieval operation is carried out (n16). After the retrieval operation, a rewind key (not shown) on the keyboard 18 is manipulated (n17) so that a rewind signal is issued to the carrier control circuit 15 through the CPU 16 to activate the rewind motor M1. Thus, the microfilm 1 is rewound on the cartridge 3 and the rewind operation is over (n18).

Figure 2C:
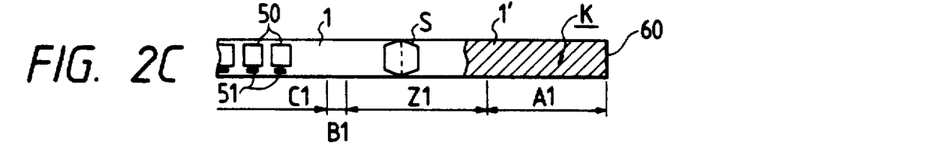
Figure 2D:
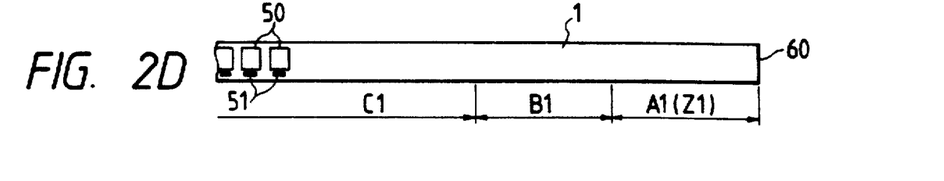

In accordance with the present embodiment, the sampling area B may be set at any point spaced from the leading edge 60 of the microfilm 1 by manipulating the keyboard 18. Accordingly, even if there is a difference between the densities of the microfilm 1 and the leader tape 1' or the leader tape 1' includes a dark area K, the transmitted light intensity can be correctly sampled.

Where the length of the leader tape 1' is short as shown in FIG. 2C, the correction of count is not necessary if the sampling area B1 is set between the splice tape S and the image frame 50, and the exact transmitted light intensity is detected and the flip marks 51 can be exactly detected. The transmitted light intensity from the normal microfilm 1 can be sampled without any trouble as shown in FIG. 2D.

FIG. 4A shows a second embodiment of a microfilm retrieval system having a mark detection photo-sensor 60 at a position off the leader illumination system. The like numerals to those shown in FIG. 1 denote like elements. Numeral 28 denotes a photo-electric conversion element such as a photo-transistor, numeral 29 denotes a light source such as a light emitting diode or a lamp and numeral 30 denotes a slitted plate having a rectangular slit 31. The photo-sensors 60 may be arranged at the opposite ends of the microfilm 1.

Pulses generated by a photo-sensor 42 as a slitted plate 41 coupled to a roller 40 is rotated at the time when the flip marks pass the photo-sensor 60 are counted to determine the size of the flip mark. The transmitted light intensity of the base portion of the microfilm is used to determine the slice level to discriminate the flip mark as it is in the first embodiment.

Figure 4B:
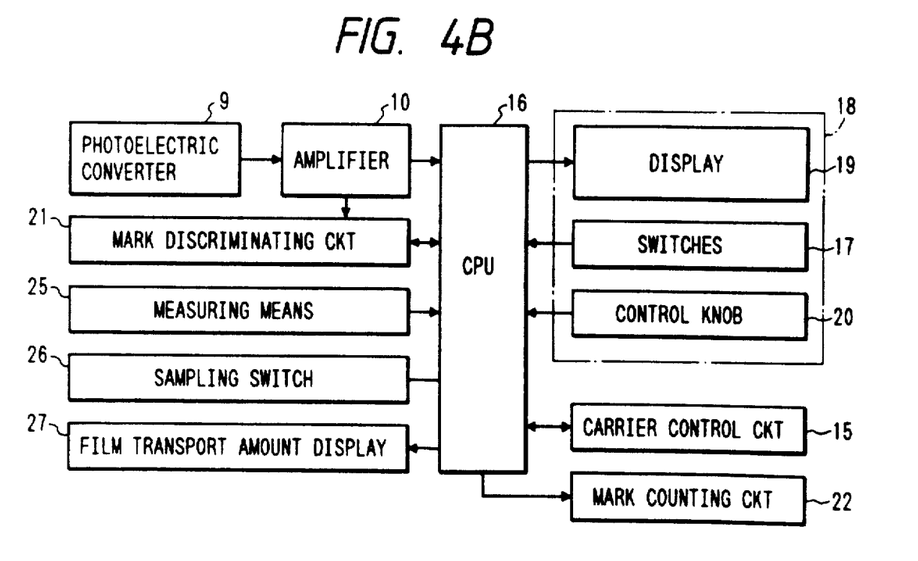
FIG. 4B shows a block diagram of principal circuits of third and fourth embodiments.

FIG. 4B shows a block diagram of a third embodiment. In the first embodiment, since the display for retrieval is shared by the display for the transport distance of the microfilm, the switching of the display is required. By providing a separate display 27 for the transport distance of the microfilm, the switching of the display is not required and the operability in entering data is improved.

A fourth embodiment is now explained with reference to the block diagram of FIG. 4B. Numeral 26 denotes a data sampling switch. The film feed is commanded by the control knob 20 to feed the microfilm 1, the transport of the microfilm 1 is stopped before the flip mark 51, and after the film has been stopped, the sampling switch 26 is turned on to effect the data sampling at the stop position to determine the slice level. Subsequently, a normal retrieval operation is carried out. By entering the sampling position by the sampling switch 26, the flip marks of most microfilms can be counted without limitation to the leader portion of the microfilm 1, and the operability is improved.

By setting the reference detection position for the transmitted light intensity for detecting the flip mark at a desired position, the transmitted light intensity and the flip marks can be exactly and readily detected even if the leader tape is short, the leader portion includes ununiform densities or a dark area, or the base density of the mark area and the density of the leader tape are different. Thus, the applicable range of the leader tape is expanded. Further, when the transmitted light intensity is detected after the splice tape area has passed, the count for the splice tape need not be corrected. The leader tape includes many breaks and dust particles due to the auto-loading and they have been causes of counting error. Such an error may be eliminated.

Figure 6A:
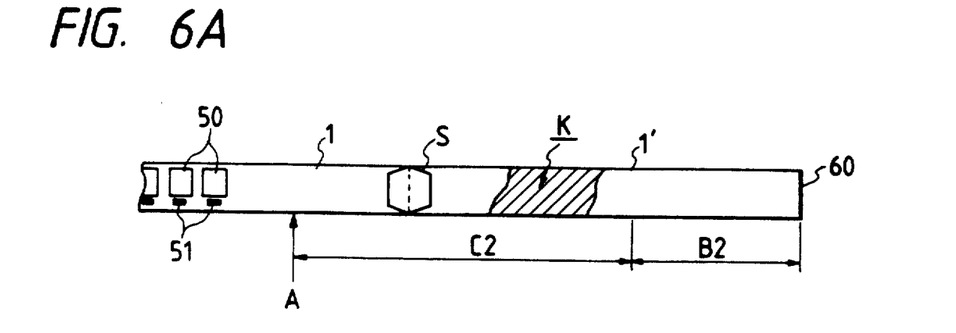
FIGS. 6A, 6B and 6C show general plan views of a microfilm retrieved in a fifth embodiment.

An embodiment of the present invention which sets the count start position of the mark by the count means, that is, the detection start position of the mark by the photo-electric conversion device 9 is now explained with reference to FIGS. 6 and 7.

Prior to the counting of the marks 51, the control knob 20 is manipulated to command the feed of the film to feed the microfilm 1, and the position at which the marks 51 can be readily counted is selected, and it is stored in the memory of the CPU 16 as the count start point A. The position at which the marks can be readily counted means the position where there is no splice tape S or the dark area K and the marks 51 can be exactly and sequentially counted starting from the leading position closest to the leading edge 60.

An operation of the present embodiment is explained with reference to the flow chart of FIG. 7. In the retrieval operation of the microfilm 1 shown in FIG. 6A, the control knob 20 which is the loading switch is manually manipulated to command the feed of the film (n21), and the CPU 16 sends an auto-loading signal to the carrier control circuit 15. In the loading step (n22), the leading edge of the microfilm 1 in the cartridge 3 is taken out by a take-out mechanism (not shown) and the rubber roller 40 is rotated so that the microfilm 1 passes between the glass plates 4 and 5 and is automatically wound on the take-up reel 6 which is driven by the motor M2.

When the winding is completed, a pulse signal is generated by the rotation of the slitted disk 41 and the photo-sensor 42 and it is read by the CPU 16 as the data for the transport distance of the microfilm 1. The transport distance from the leading edge 60 to the position corresponding to the photo-sensor of the optical fiber 7 is B2. However, because there are the dark area K and the splice tape S included between this position and the leading mark 51, the dark area K and the slice tape S may be counted as the marks.

Thus, the control knob 20 is manually manipulated command to further feed of the microfilm 1 (n23), and the count start position A is set at immediately before the leading mark 51. After the count start position A has been set (n24), the stop of the feed of the film is commanded by manipulating the control knob 20 to stop the transport of the microfilm 1. The content of the transport distance data displayed on the display 19 is entered as the transport distance C2 (FIG. 6A) to the start of count by manipulating the switch 17 such as the ten-key on the keyboard 18 (n25).

Then, the control knob 20 or the rewind key (not shown) on the keyboard 18 is manipulated (n26) to command the film rewind so that the rewind motor M1 is actuated by a signal from the CPU 16 and the microfilm 1 is rewound on the cartridge 3. After the rewind, the microfilm 1 is stopped (n27).

The frame position to be retrieved is entered by the ten-key 17 on the keyboard 18 (n28). The search key (not shown) on the keyboard 18 is depressed to conduct the auto-loading shown in the step n22 (n29). The microfilm 1 is fed to the count start position A stored in the memory of the CPU 16, and the counting of the marks is started (n30).

In the present embodiment, a plurality of optical fibers 7 are arranged at a predetermined pitch, and the mark 51 is detected by the optical fiber 7 which the mark 51 on the microfilm 1 interrupts (n31). The designated frame is retrieved by the CPU 16 and the mark counter 22 based on the detected signal (n32). When the frame to be retrieved is reached, the CPU 16 sends a stop signal to the carrier control circuit 15 to control the motors M1 and M2 to stop the microfilm 1 at the image frame position to be retrieved (n33). The image on the microfilm 1 is enlarged by the projection lens 8 and the light path is deflected by the reflection mirror 13 and the image is projected on the screen 14.

The retrieved image frame number is displayed on the display 19 on the keyboard 18 (n34). Subsequently, a normal retrieval operation is carried out (n35). When the retrieval operation is over and the rewind key (not shown) on the keyboard 18 is depressed (n36), a rewind signal is issued from the CPU 16 to the carrier control circuit 15 so that the rewind motor M1 is actuated. Then, the microfilm 1 is rewound on the cartridge 3 and the rewind operation is completed (n37).

Figure 6B:
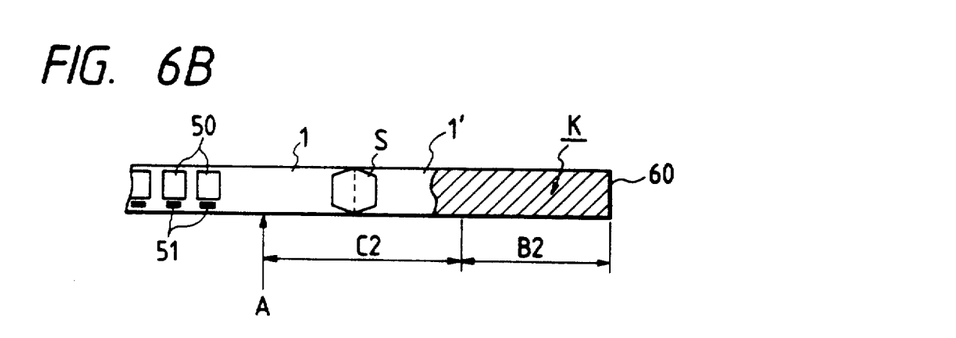
Figure 6C:
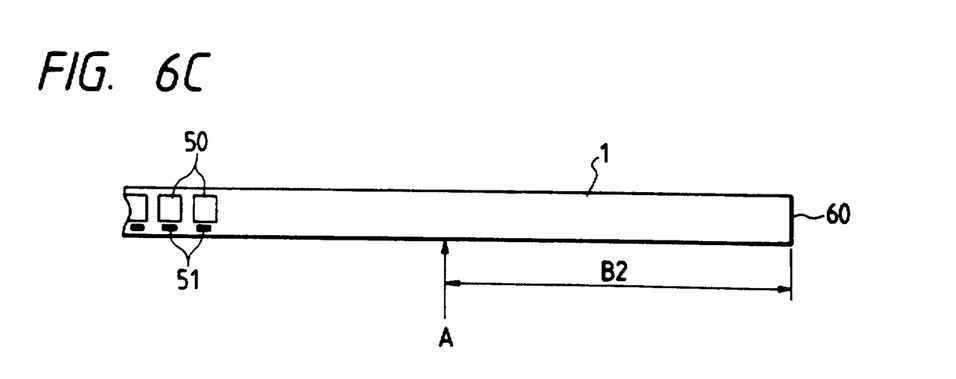
Figure 7:
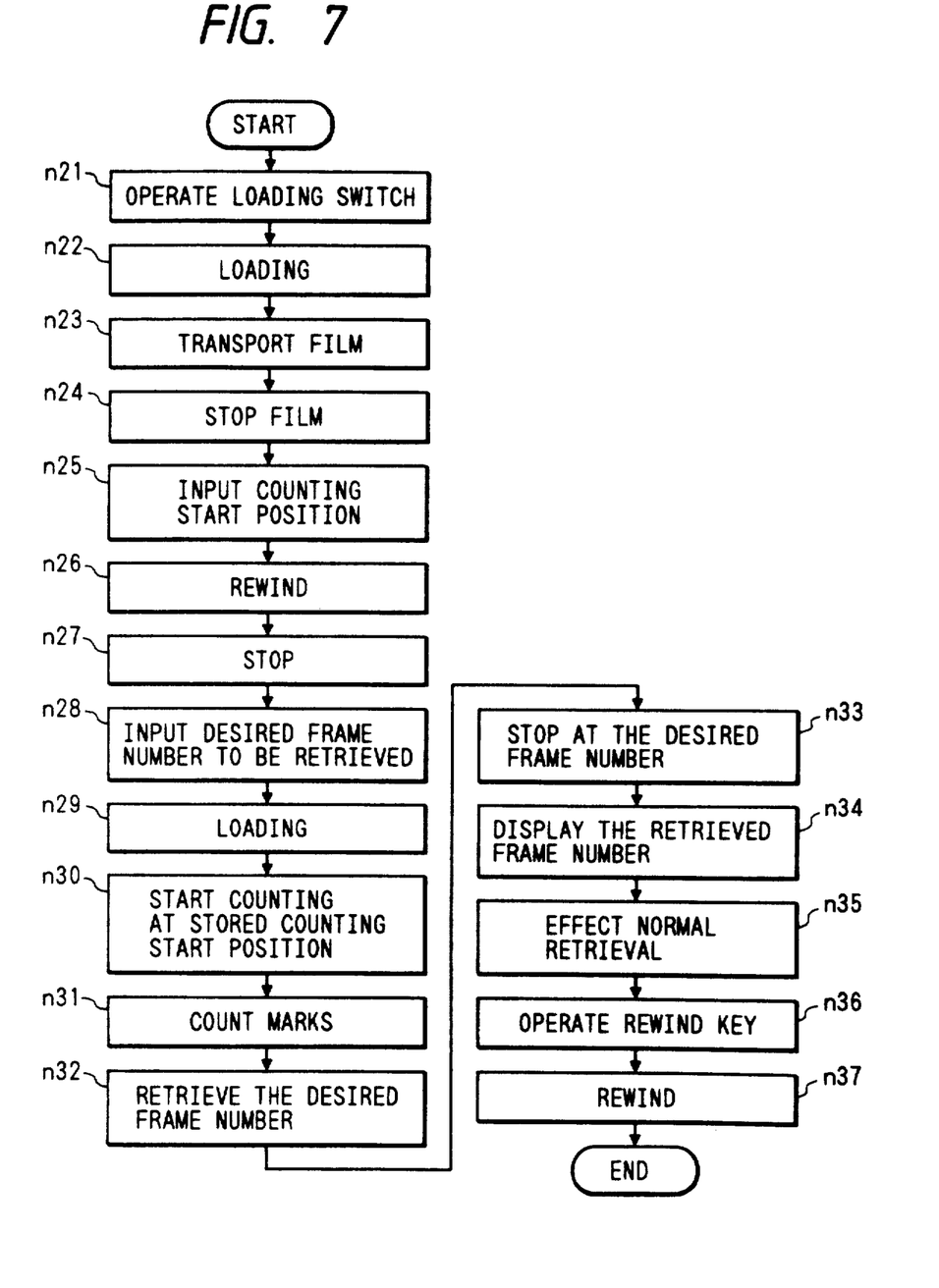
FIG. 7 shows a flow chart of an operation of the fifth embodiment.

In the present embodiment, the count start position A can be set at any position spaced from the leading edge 60 of the microfilm 1 by manipulating the keyboard 18. Accordingly, the counting is done exactly even if there is a difference between the densities of the microfilm 1 and the leader tape 1' or the leader tape 1' includes the dark area K.

Where the length of the leader tape 1' is short as shown in FIG. 6B, the correction of the count is not necessary if the count start position A is set between the splice tape S and the mark 51. Thus, the marks 51 can be exactly counted. The counting for the normal microfilm 1 is done without trouble as shown in FIG. 6C.

Figure 8:
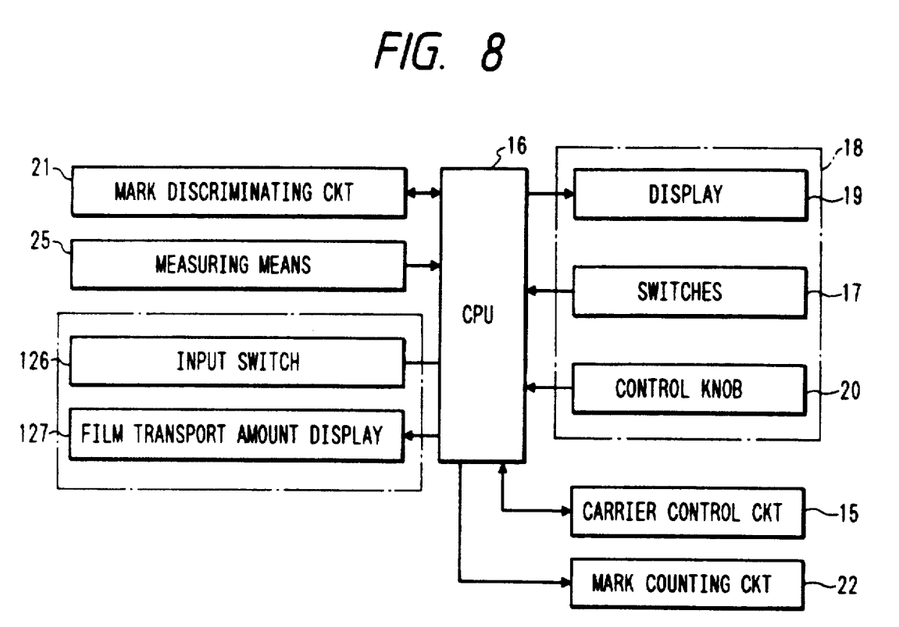
FIG. 8 shows a block diagram of a configuration of a sixth embodiment.

FIG. 8 shows a block diagram of another embodiment. In the previous embodiments, since the display for the retrieval is shared by the display for the transport distance of the microfilm, the switching of the display is required. By providing a separate display 127 for the transport distance of the microfilm, the switching of the display is not necessary and the operability in entering the data is improved.

Numeral 126 denotes a switch for entering the count start position. The microfilm 1 is fed by the control knob 20, the transport of the microfilm 1 is stopped before the mark 51, and the entry switch 126 is turned on to set the count start position A. Subsequently, a normal retrieval operation can be carried out. By the provision of the entry switch 126, the marks of most microfilms can be counted without limitation to the leader portion of the microfilm 1 and the operability is improved.

As explained above, since the count start position for the marks can be set at any point, the counting of the marks can be exactly and readily carried out even if the leader portion is short or the leader portion includes a dark area.

What is claimed is:

1. A film retrieval system comprising:
   transport means for transporting an elongated film provided with marks corresponding to images from a supplying portion through an illumination position to a winding portion along a transport direction;
   a light source for illuminating a film positioned at the illumination position;
   detecting means for detecting the intensity of light transmitted through the film positioned at the illumination position;
   reference means for determining a reference in accordance with the light intensity detected by said detecting means;
   discriminating means for determining the presence or absence of the mark on the basis of the reference determined by said reference means; and
   setting means for setting a timing of detection by said detecting means in order to detect the light intensity transmitted through the film at a position distant from a leading end of the film by any selected distance with respect to the transport direction of the film.

2. A film retrieval system according to claim 1, wherein said setting means comprises measuring means for measuring the length of film transported, detection control means for starting the operation of said detecting means when said measuring means measures a previously set value, and means for changing the set value.

3. A film retrieval system according to claim 1, wherein sad detecting means detects the intensity of light transmitted through a portion of the film where the mark is provided as well as a portion of the film where no mark is provided.

4. A film retrieval system according to claim 1, further comprising count means for counting the marks discriminated by said discriminating means and control means for controlling the operation of said transport means in accordance with the marks counted by the counting means.

5. A film retrieval system for retrieving a desired image on a film provided with a number of images and marks for retrieval, comprising:
   transport means for transporting a film across an illumination path;
   a light source for illuminating the film positioned at the illumination path;
   detecting means for detecting the intensity of light transmitted through a portion of the film where the mark is provided and a portion of the film where no mark is provided, which film is positioned at the illumination position;

reference means for determining a reference on the basis of output from said detecting means;

discriminating means for discriminating the presence or absence of the mark by comparing the reference determined by said reference means and the output from said detecting means;

count means for counting the marks discriminated by said discriminating means; and setting means for setting a time for starting the operation of said detecting means in order to detect the intensity of light transmitted through the film at a position distant from a leading end of the film by any selected distance.

6. A film retrieval system according to claim 5, wherein said setting comprises measuring means for measuring the length of the film transported, and means for controlling the start of the operation of said detecting means on the basis of the length measured by said measuring means.

7. A film retrieval system according to claim 6, further comprising input means for inputting data, wherein the detecting operation of said detecting means is prohibited until said measuring means measures a length of film that corresponds to the input data.

8. A film retrieval system according to claim 6, wherein a leader tape is connected to the leading end of the film.

9. A film retrieval system according to claim 8, wherein said transport means transports the film wound on a first reel to a second reel.

10. A film retrieval system according to claim 5, wherein said setting means comprises input means for inputting data nd control means for starting the operation of said detecting means when a length of the film corresponds to the input data.

11. A film retrieval system according to claim 10, comprising measuring means for measuring the length of film transported, and display means for displaying the length of film measured, with data being input to said input means on the basis of the content displayed by said display means.

12. A film retrieval system according to claim 5, wherein said setting means comprises input means for inputting data for setting the operating start of said detecting means, and control means for controlling the operation of said detecting means to start when the portion of the film corresponding to the data input is positioned at the illumination path.

13. A film retrieval system according to claim 12, wherein retrieval of the film is instructed after data is input to said input means.

* * * * *

UNITED STATES PATENT AND TRADEMARK OFFICE
CERTIFICATE OF CORRECTION

PATENT NO. : 5,272,352
DATED : December 21, 1993
INVENTOR(S) : Maetani et al.

It is certified that error appears in the above-indentified patent and that said Letters Patent is hereby corrected as shown below:

On the title page:
[30] FOREIGN APPLICATION PRIORITY DATA:

"May 29, 1991 [JP] Japan ............... 3-1555801" should read --May 29, 1991 [JP] Japan ............. 3-155801--.

COLUMN 3:

Line 28, "to" should be deleted.

COLUMN 4:

Line 57, "actual," should read --actuality,--.

COLUMN 8:

Line 47, "sad" should read --said--.

COLUMN 9:

Line 17, "setting" should read --setting means--.

UNITED STATES PATENT AND TRADEMARK OFFICE
CERTIFICATE OF CORRECTION

PATENT NO. : 5,272,352

DATED : December 21, 1993

INVENTOR(S) : Maetani et al.

It is certified that error appears in the above-indentified patent and that said Letters Patent is hereby corrected as shown below:

COLUMN 10:

Line 9, "nd" should read --and--.

Signed and Sealed this

Ninth Day of August, 1994

Attest:

BRUCE LEHMAN

Attesting Officer

Commissioner of Patents and Trademarks